Feb. 3, 1942.   L. S. KASSEL   2,271,646
CONTROL OF CONTACT CATALYTIC REACTIONS
Filed May 17, 1939   4 Sheets-Sheet 1
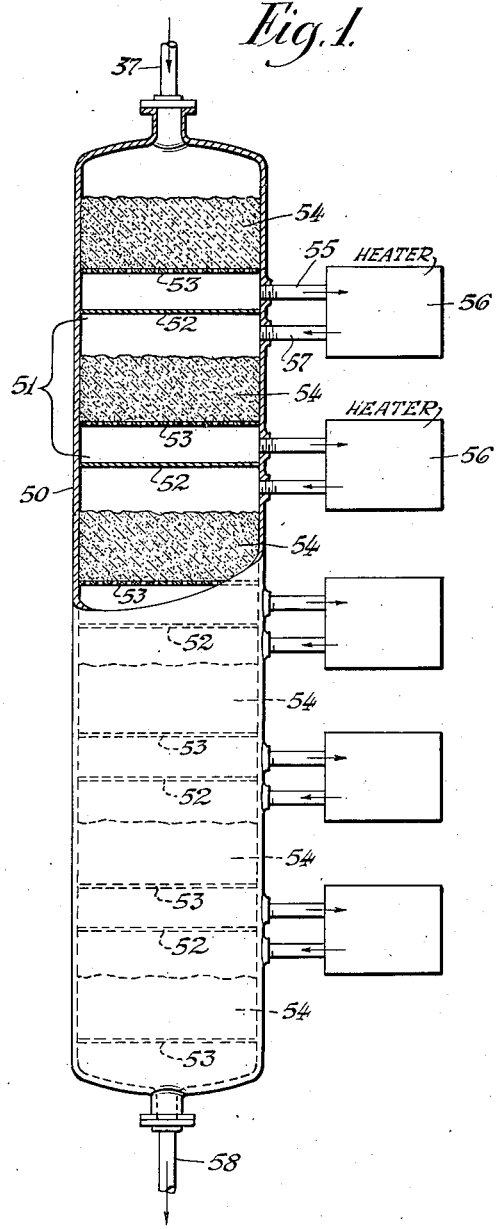

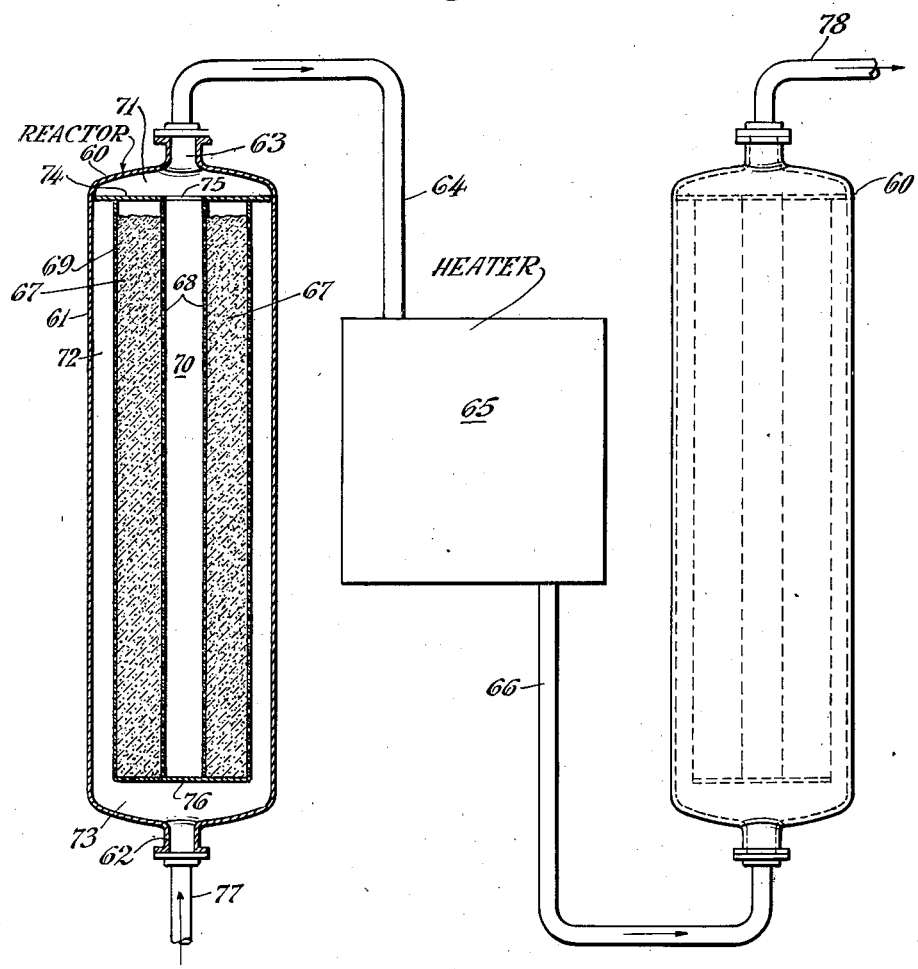

Feb. 3, 1942.                L. S. KASSEL                2,271,646
                CONTROL OF CONTACT CATALYTIC REACTIONS
                    Filed May 17, 1939        4 Sheets-Sheet 3
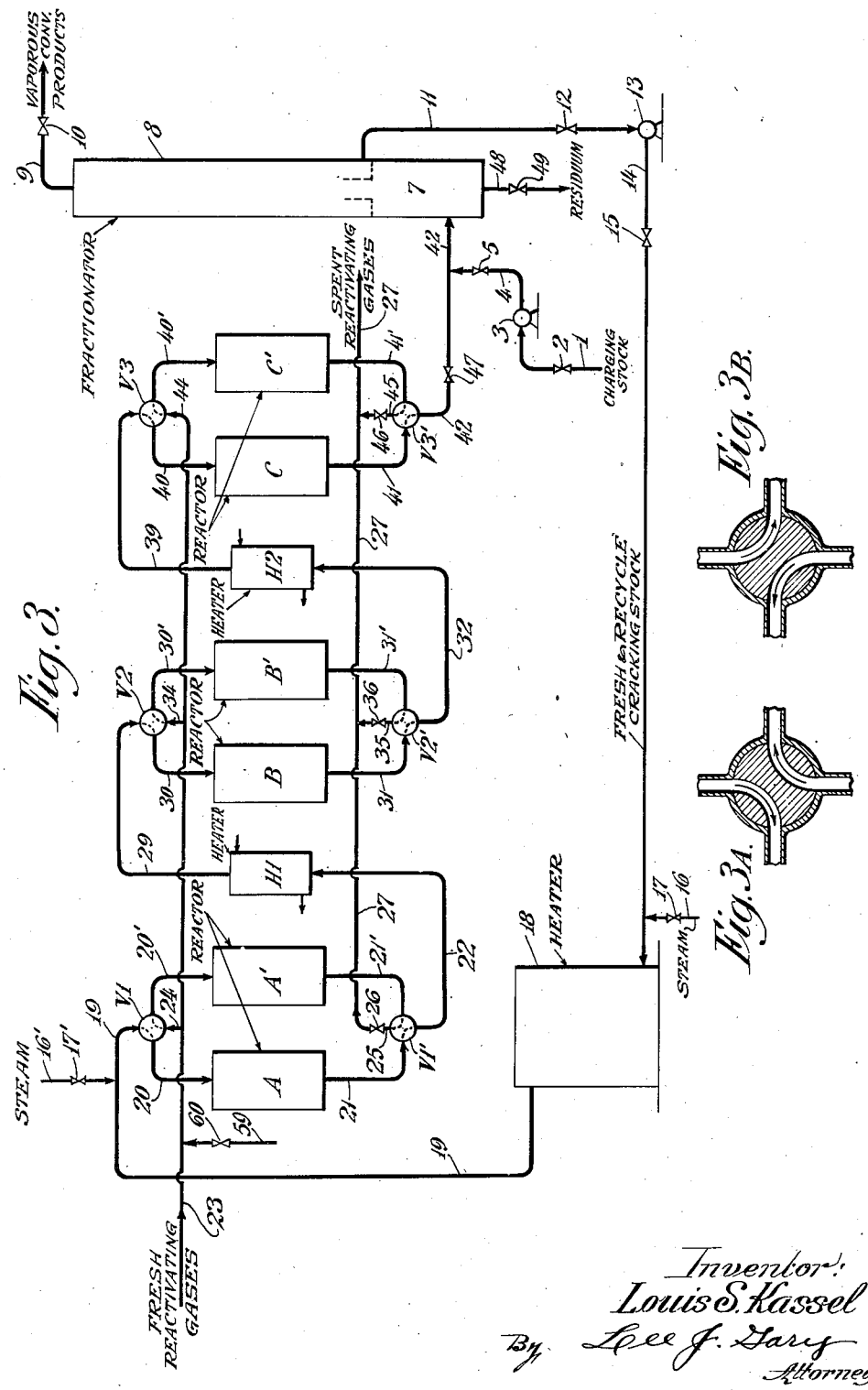
Inventor:
Louis S. Kassel
By Lee J. Gary
   Attorney.

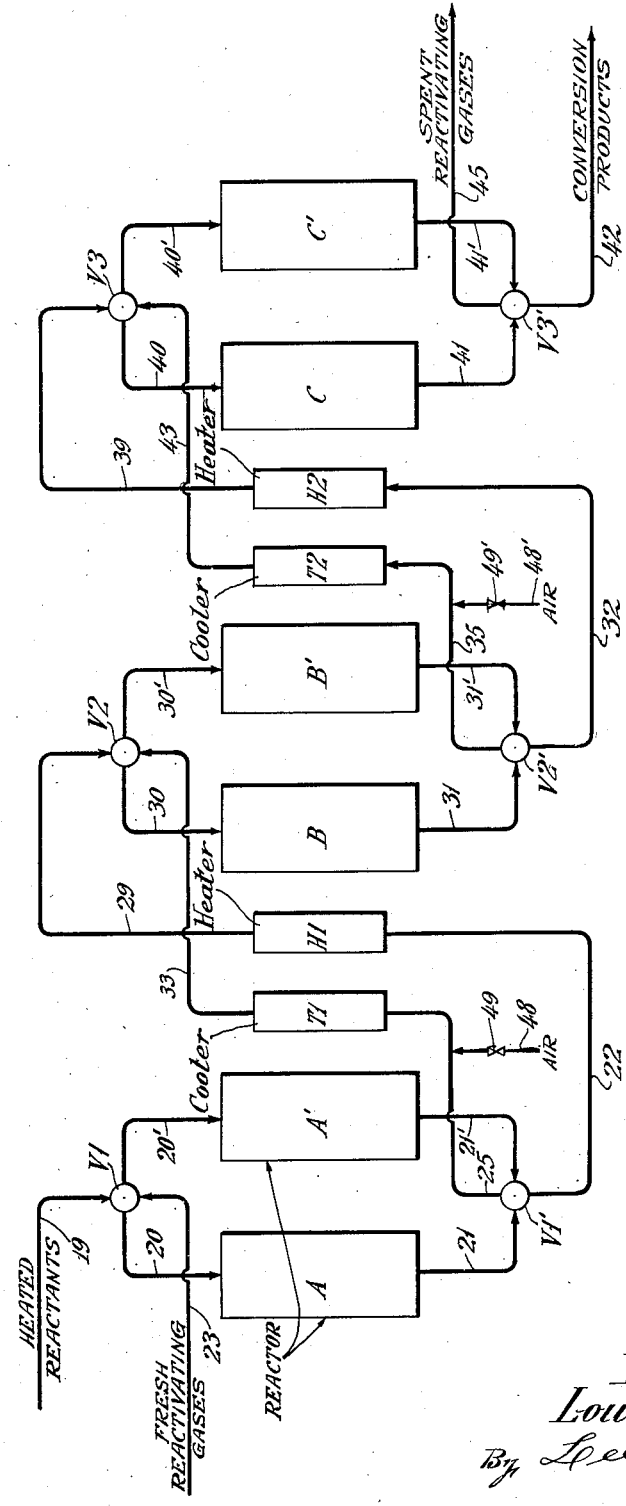

Patented Feb. 3, 1942

2,271,646

UNITED STATES PATENT OFFICE 2,271,646

CONTROL OF CONTACT CATALYTIC REACTIONS

Louis S. Kassel, Chicago, Ill., assignor to Universal Oil Products Company, Chicago, Ill., a corporation of Delaware Application May 17, 1939, Serial No. 274,178

2 Claims. (Cl. 196—49)

The invention is particularly directed to an improved method of controlling temperatures in reactions involving the use of contact masses such as catalytic material capable of promoting the desired reaction. The invention involves the use of a plurality of reactors containing said contact masses and connected for the flow of reactants therethrough in series, with provision for tempering or readjusting the temperature of the reactants passing from each reactor to the next succeeding reactor by heating or cooling said reactants, as required.

The invention is applicable to either endothermic or exothermic reactions and a more specific embodiment of the invention is directed to that type of catalytic conversion process in which the reaction taking place in each reactor is periodically alternated from endothermic to exothermic and vice versa. Catalytic polymerization and catalytic hydrogenation of hydrocarbons are good examples of specific exothermic reactions in which the features of the invention may be advantageously employed, while catalytic cracking and catalytic dehydrogenation of hydrocarbons will serve to exemplify endothermic reactions which may be advantageously conducted in accordance with the features of the invention. In both catalytic cracking and catalytic dehydrogenation, as now commercially practiced, the activity of the catalyst deteriorates quite rapidly due to the deposition thereon of heavy carbonaceous materials formed in the reaction and it is advantageous to reactivate the catalyst at relatively frequent intervals by burning said carbonaceous material therefrom, this being accomplished by passing a stream of heated relatively inert gases containing controlled amounts of air through the catalyst bed. This burning of the carbonaceous material is, of course, an exothermic reaction and some form of temperature control is required to prevent excessive heating of the catalyst particles and consequent destruction of their catalytic activity. Both catalytic cracking and catalytic dehydrogenation therefor exemplify the type of conversion process to which the more limited aspects of the invention are particularly well adapted.

When strong endothermic or exothermic reactions, such as those above mentioned, are conducted by contacting the reactants with a mass of catalytic material in the manner heretofore commonly employed, the design of the apparatus, particularly with respect to the size of the zone or zones containing the catalytic material, is limited by heat transfer requirements in order to adequately control the reaction temperature. For example, it is customary to dispose the catalytic material in a plurality of tubular elements connected for the parallel flow of reactants therethrough and to bathe the tubes in a fluid heating or cooling medium, depending upon whether the reaction is endothermic or exothermic. In such cases, the diameter of each tube is limited to that which will give a good rate of heat transfer from catalyst bed disposed therein and reactants passing therethrough to the cooling medium surrounding the tube or from the heating medium surrounding the tube to the reactants and catalyst. Increased capacity cannot be obtained with the same degree of control, except by increasing the number of parallel tubes employed without increasing their size. Reactors embodying this type of design become extremely cumbersome and expensive with the high charging stock capacities which are ordinarily desired for commercial operation, with the result that the economies one should expect from large scale operations are not obtained.

The invention seeks to overcome the limitations above mentioned and make it possible to conduct large scale catalytic operations such as above mentioned in an efficient and economic manner. In the past, catalyst beds employed in reactions in which careful temperature control is essential for good results have been required to serve both as catalytic agents and as heat-transfer material. The present invention is based on recognition of the undesirable factors which this two-fold use of the catalyst introduces and obviates the same by employing a plurality of catalyst beds connected for the series flow of reactants therethrough with provision for heating or cooling the reactants, as required, (depending upon the endothermic or exothermic nature of the reaction) as they pass from each catalyst bed to the next succeeding catalyst bed of the series. The design of the apparatus and the conditions of operation are such that the temperature of the reactants does not rise or fall beyond allowable limits in passing through any catalyst bed of the series and such that the temperature of the reactants is readjusted to the desired value as they pass from one catalyst bed to another.

The improved method herein provided for conducting either endothermic or exothermic catalytic reactions, or both, is not limited to the use of any specific form or type of apparatus since a great number of specific forms of apparatus may be devised to incorporate the features of the invention. Neither is the invention limited to any specific variety of endothermic or exothermic reaction of the catalytic type since, as evidenced by the examples above given, its advantageous features are applicable to a wide variety of specific reactions, as well as various combinations thereof. However, to avoid confusion the following description will be directed primarily to illustrating the features of the invention as applied to the catalytic cracking of hydrocarbon oils and, further, to periodic reactivation of the catalytic material employed.

In the accompanying drawings,

Fig. 1 illustrates a simple form of apparatus in which the improved process provided by the invention may be successfully conducted.

Fig. 2 illustrates a modified form of apparatus in which the improved process may be successfully conducted.

Fig. 3 is essentially a flow diagram of a catalytic cracking process incorporating the features of the invention and employing a plurality of catalytic reaction zones connected for series flow of hydrocarbon vapors and parallel flow of reactivating gases therethrough, in each of which zones catalytic cracking and reactivation of the catalytic material are alternately accomplished with provision for controlling the temperature of the stream of reactants flowing from each catalyst zone to the next catalyst zone of the series in which cracking is accomplished.

Figs. 3A and 3B are details in section of the two-way inlet and outlet valves diagrammatically indicated in Fig. 3, Fig. 3A showing a valve in one position and Fig. 3B showing the passageways therethrough shifted.

Fig. 4 is a flow diagram illustrating a modification of a portion of the flow illustrated in Fig. 3.

Referring to Fig. 1, reactor 50 is an elongated cylindrical column divided into a plurality of compartments 51 by means of imperforate partition plates 52 extending horizontally across the column.

Each of the compartments 51 is provided with a perforate plate 53 which serves as a supporting member for the bed of catalytic material 54 disposed in each of the compartments.

A space is left on opposite sides of each of the partition plates 52, the upper space between perforate member 53 and plate 52 communicating through conduit 55 with the inlet of a suitable heater or heat exchanger 56 which discharges through line 57 into the space between plate 52 and the next succeeding catalyst bed 54.

The hydrocarbons to be catalytically cracked enter the upper end of reactor 50 through line 37 preferably in essentially vaporous state and preheated by well known means, not illustrated, to a temperature at which the desired cracking reaction will occur upon contact with the catalytic material. These heated vapors pass downward through the first catalyst bed 54 in direct and intimate contact with the catalyst particles and the cracking reaction accomplished in this bed reduces the temperature of the vapors undergoing treatment. Before contacting the next bed of catalytic material, the vapors are therefore passed through the first heater 56 and are therein reheated to substantially the same temperature as that prevailing above the first catalyst bed and the reheated vapors are supplied to the second compartment 51 wherein they pass through the bed of catalytic material disposed therein and are thereby subjected to further cracking treatment. Since there is a small temperature drop in each catalyst bed, the vapors leaving each bed, except the last, pass through one of the heaters 56 prior to their contact with the next succeeding bed and the final conversion products are directed from the lower portion of the reactor through conduit 58 to suitable separating and recovery equipment, not illustrated.

It is, of course, within the scope of the invention to employ any required number of beds of catalytic material through which the reactants are passed in series, the size of each bed being sufficiently small in proportion to the volume of vapors passed therethrough in a given time that the temperature drop is not excessive and the temperature of the reactants is maintained within the range of that required for best results. The various beds of catalytic material may be disposed within a single reactor or two or more reactors, each containing one or more beds of catalytic material, may be employed in series, provision being made for reheating the reactants as they pass from each catalyst bed to the next succeeding bed.

An arrangement involving the use of more than one reactor of a different form than that illustrated in Fig. 1, is shown in Fig. 2.

In the case here illustrated, two similar reactors 60 are employed in series, each of these comprising a cylindrical shell 61 having an inlet connection 62 and an outlet connection 63. A heater or heat exchanger 65 of any suitable well known form is interposed between the two reactors, the inlet side of the heater being connected by means of conduit 64 with the outlet side of the first reactor of the series, and the outlet side of heater 65 being connected by means of conduit 66 with the inlet side of the second reactor of the series.

In each of the reactors, a bed of suitable catalytic material 67 is disposed between spaced annular perforate plates 68 and 69, the space 70 enclosed by plate 68 forming a cylindrical passageway from the catalyst bed to outlet compartment 71 of the reactor, and an annular space 72, which connects the opposite side of the catalyst bed with the inlet compartment 73 of the reactor, being provided between plate 69 and the cylindrical walls 61. The fluid passageway 72 and the space containing the catalytic material are blanked off at the upper portion of the reactor by means of a plate 74, through which a central opening 75 is provided to connect space 70 with outlet compartment 71. The lower end of fluid passageway 70 and the space containing the catalytic material is blanked off from inlet compartment 73 by means of plate 76. The annular space 72 communicates with inlet compartment 73 through the space provided between the edges of plate 76 and the cylindrical wall 61 of the reactor.

The flow of reactants through the equipment illustrated in Fig. 2 is as follows: They enter inlet compartment 73 of the first reactor, preferably in preheated state, through line 77 and pass upwardly therefrom into the annular space 72, wherefrom they pass through the perforations of plate 69 into the catalyst bed and therein undergo conversion by contact with the catalytic material. The partially converted reactants leave the catalyst bed through the perforations in plate 68 and pass into space 70, from which they flow upwardly into outlet compartment 71 and are thence directed through line 64 to heater 65. In heater 65 the partially converted vapors are supplied with a quantity of additional heat substantially equivalent to that taken up by the reaction which occurs in the first reactor. The reheated materials are directed from heater 65 through line 66 into the second reactor wherethrough the flow is the same as that in the first reactor and wherein additional conversion of the reactants is accomplished by their contact with the catalytic material disposed therein. The resulting partially cooled products are removed from the upper portion of the second reactor through line 78 and may be supplied to suitable separating and recovery equipment, not illustrated, or through any desired number of subsequent reheating zones and reactors in series.

Referring now to Fig. 3 which, as previously mentioned, is essentially a flow diagram of a catalytic cracking system for use in the process of the invention: The charging oil for the system is supplied through line 1 and valve 2 to a pump 3 by means of which it is fed through line 4 and valve 5 into line 42, wherein it commingles with and serves to partially cool the hot conversion products discharged, as subsequently described, from the last catalytic reactor. The commingled charging stock and conversion products are discharged from line 42 into separating chamber 7, wherein heavy residual liquid components of the products and any heavy fractions of the charging oil, undesired as components of the cracking stock, are separated from lower boiling vaporous fractions of the conversion products and charging oil. The non-vaporous residual fractions are removed from chamber 7 through line 48 and valve 49 to cooling and storage or elsewhere, as desired, and the vaporous fractions pass from chamber 7 to fractionator 8, wherein their light components boiling within the range of the desired final light distillate product, such as gasoline, are separated from the heavier fractions of the vapors, which latter are condensed in fractionator 8 as reflux condensate.

Fractionated vapors of the desired end-boiling point are directed from the upper portion of fractionator 8 through line 9 and valve 10 to any suitable form of condensing and recovery equipment, not illustrated.

The reflux condensate formed in fractionator 8, which comprises intermediate liquid conversion products and charging oil, is directed from the lower portion of fractionator 8 through line 11 and valve 12 to pump 13 by means of which it is fed through line 14 and valve 15 to heater 18.

In heater 18, the reflux condensate supplied thereto preferably is substantially completely vaporized and is heated to a temperature at which conversion of the vapors will occur upon contact with the cracking catalyst employed. The resulting heated vapors are directed from heater 18 through line 19 to the first reactor of the system and thence through subsequent reactors, after reheating as will be later described. Preferably, in order to assist vaporization of the cracking stock in heater 18 and to reduce the effective pressure employed in this heater and in the subsequent reactors, regulated quantities of steam or other relatively inert gas is introduced through line 16 and valve 17 into the stream of reflux condensate supplied to heater 18 or, when desired, steam superheated to the desired temperature or other heated inert gas may be supplied to line 19 through line 16' and valve 17'.

In the particular case here illustrated, three pairs or a total of six catalytic reactors are employed, the first pair being designated as A and A', the second pair as B and B' and the third pair as C and C'. Each reactor contains a bed of catalytic material, not indicated in the drawings, capable of promoting the desired cracking reaction when in fresh or freshly revivified state and the size of each catalyst bed is so proportioned in relation to the volume of vapors to be cracked in a given time, that the drop in temperature sustained by the vapors in their passage through the bed is not excessive (i. e., the temperature range between the vapors entering the bed and leaving the bed is within the limits of the temperature range at which active catalytic cracking of the vapors will occur).

One reactor of each pair is employed as a cracking zone, while the catalyst in the other reactor of each pair is being reactivated by passing therethrough a stream of hot relatively inert gases (such as combustion gases, for example,) containing controlled amounts of air or oxygen. The reactors of each pair are alternately operated with respect to the service for which they are employed (processing and reactivation) by means of the inlet switching valves V1, V2 and V3 and the outlet switching valves V1', V2' and V3'.

Any suitable valve arrangement capable of switching the direction of flow of the stream of reactants and the stream of reactivating gases may be employed within the scope of the invention and for the sake of simplifying the description and illustrating the process without unnecessary complications, each of the switching valves is here illustrated as a single two-way valve in which the position of the two passageways therethrough may be shifted, as illustrated in Figs. 3A and 3B.

Assuming that the inlet valves V1, V2 and V3 are each adjusted to the position illustrated in Fig. 3A and that the outlet switching valve V1', V2' and V3' are each adjusted to the position illustrated in Fig. 3B, the stream of hydrocarbon vapors from line 19 flows through valve V1 to line 20 and thence to reactor A and, after passing through the catalyst bed in this reactor, the vapors are directed through line 21 to valve V1', wherethrough they pass to line 22 and thence to heater H1, which may be any suitable form of heater or heat exchange device capable of reheating the vapors to substantially the same temperature as that prevailing in line 19. The reheated vapors are directed from heater H1 through line 29 to valve V2 wherethrough they pass to line 30 and thence to reactor B. After passing through the bed of catalytic material in reactor B, the partially cooled vapors are directed therefrom through line 31 to valve V2' wherethrough they pass to line 32 and thence to heater H2 which is similar to heater H1 and serves the same purpose. The reheated vapors are directed from heater H2 through line 39 to valve V3, wherethrough they pass to line 40 and thence to reactor C. The partially cooled vapors, which have passed through the catalyst bed in reactor C, are directed therefrom through line 41 to valve V3', wherethrough they pass to line 42 and thence through valve 47 into separating chamber 7, together with charging stock supplied to line 42 as previously described. Thus, the vapors to be cracked, instead of passing through a single relatively large catalyst bed in which the temperature drop would be excessive in the absence of means such as previously mentioned for preventing the same, are passed in series through three smaller catalyst beds wherein the temperature drop is not excessive. The vapors are reheated to the desired degree as they pass from each of the first two catalyst beds to the next successive bed, the reaction temperature being thereby maintained within optimum limits during the entire catalytic reaction.

With the flow of hydrocarbon vapors through reactors A, B and C, in the manner above described, the reactivating gases supplied to the system in heated state through line 23 are directed through branch lines 24, 34 and 44 to the respective valve V1, V2 and V3, wherethrough they pass to respective lines 20', 30' and 40' and thence to the respective reactors A', B' and C', wherein they contact the beds of catalytic material disposed in these zones which have become fouled or partially spent by previous use. The deleterious deposits of carbonaceous material are thereby burned from the catalyst beds, the rate of burning being regulated by the oxygen content of the reactivating gases which is controlled to prevent the development of excessive temperature in the catalyst bed. The resulting spent reactivating gases and combustion products are directed from the respective reactors A', B' and C' through the respective lines 21', 31' and 41' to the respective outlet switching valves V1', V2' and V3', wherethrough they pass to the respective lines 25, 35 and 45 and thence through the respective valves 26, 36 and 46 to line 27.

The temperature of these gases will be increased by the exothermic reaction (burning of the carbonaceous material) in the reactors and, preferably, useful heat is recovered therefrom for any required purpose and in any desired manner, not illustrated, following which the resulting cooled gases may be wasted or, when desired, they may be recirculated by means of a suitable pump or compressor, not shown, to line 23 and therein commingled with controlled amounts of air for supporting combustion, the latter being supplied to line 23 through line 59 and valve 60. In this manner, the inert components of the reactivating gases may be continuously recycled through the system, but it is also within the scope of the invention, when desired, to continuously generate fresh combustion gases, for example, or steam for this purpose by well known means, not illustrated.

Following the operation above described, when the catalyst in reactors A, B and C approaches a state of reduced activity at which it is advantageous to employ freshly revivified catalyst for treatment of the vapors, the supply of air to the reactivating gas stream is momentarily discontinued so that the reactors A', B' and C' are purged of oxygen-containing gases, while the inlet and outlet switching valves remain in an unchanged position. Immediately following this purge of reactors A', B' and C', the position of the inlet switching valves V1, V2 and V3 is shifted to that indicated in Fig. 3B, while the supply of air to line 23 is still discontinued so that reactors A, B and C are purged of hydrocarbon vapors and the stream of vapors from line 23 is diverted to reactors A', B' and C'. After a time sufficient to allow purging of each of the reactors, the position of outlet valves V1', V2' and V3' is shifted to that indicated in Fig. 3A and air is again admitted to line 23 whereupon the catalytic material in reactors A, B and C is revivified and the catalytic material in reactors A', B' and C' is utilized to promote catalytic cracking of the vapors.

Switching of the stream of hydrocarbon vapors and reactivating gases is periodically repeated by reversing the position of the switching valves so that the partially spent catalytic material in one reactor of each pair is continuously being reactivated and the stream of hydrocarbon vapors is continuously cracked in the other reactors of each pair. Preceding the change of function in each reactor, the reactor is purged with relatively inert gases and preferably, as indicated in the foregoing description, there is a sufficient delay between the switching of the inlet valves and the switching of the outlet valves to prevent the loss of valuable conversion products from the reactor being purged thereof and to prevent the commingling of inert gases from the reactors which have been purged with the stream of conversion products. Also, the operation of the valves on the various pairs of reactors are correlated to prevent the commingling of reactants or conversion products with reactivating or purging gases, i. e., valves V1, V2 and V3 are first switched and after a short delay, corresponding to the time required to purge the reactors, valves V1' and V2' and V3' are simultaneously shifted.

The switching valves may be manually operated but, preferably, to simplify operation of the process and avoid mistakes in operation of the valves which might prove disastrous, both the inlet and the outlet switching valves, as well as valve 60 in air-line 59 are operated from a single time cycle controller of any well known form in accordance with a definite predetermined schedule. However, except with respect to the sequence of operation of the various valves, this is not a novel part of the present invention and for the sake of avoiding unnecessary complications, automatic control means are not illustrated. Several forms of time schedule controllers, capable of accomplishing the desired results, are now available.

Referring now to Fig. 4 which illustrates a modification of a portion of the flow illustrated in Fig. 3; the various reactors, switching valves, heaters and communicating lines designated by the same reference numerals in Fig. 4 as in Fig. 3 represent identical or equivalent equipment which functions in the manner described with reference to Fig. 3.

The essential difference between the flow shown in Figs. 3 and 4 is that in the latter the reactivating gases pass in series through the reactors in which the catalytic material is being revivified and provision is made for cooling these gases as they pass from the first and second reactors wherein revivification is taking place to the next succeeding reactor.

In Fig. 4, the reactivating gases are supplied in heated state through line 23 to valve V1 and, with the switching valves V1, V2 and V3 in the position shown in Fig. 3A and valves V1', V2' and V3' in the position shown in Fig. 3B, the reactivating gases pass through valve V1 to line 20', thence to reactor A' from which the resulting spent reactivating gases and combustion products are directed through line 21' to valve V1' wherethrough they pass to line 25 and thence to cooler T1, which may comprise any suitable type of heat transfer equipment capable of reducing the temperature of the gases to substantially the same as that to which they are supplied to reactor A'.

Regulated quantities of air are added to the stream of relatively inert gases passing through line 25, the air being admitted thereto through line 48 and valve 49 so that the oxygen content of the reactivating gases, as well as their temperature, is readjusted to substantially the same value as that of the stream of reactivating gases supplied to reactor A'.

The partially cooled oxygen-containing gases from cooler T1 pass through line 33 to valve V2, wherethrough they are directed to line 30' and thence to reactor B'. The resulting spent revivifying gases and combustion gases are directed from reactor B' through line 31' to valve V2' which directs this stream to line 35 and thence through cooler T2, which is the same in form and function as cooler T1, air being added in regulated quantities to the stream of relatively inert gases passing through line 35 by means of line 48' and valve 49' communicating with line 35.

The gases leaving cooler T2 are of substantially the same temperature and of substantially the same oxygen-content as the reactivating gases supplied to reactor A' and they are directed through line 43 to valve V3, wherethrough they pass to line 40' and thence to reactor C'. The resulting spent revivifying gases and combustion products are directed from reactor C' through line 41' to valve V3' wherefrom they pass through line 45 to suitable heat recovery equipment, not illustrated, or elsewhere, as desired.

When the position of the switching valves is reversed so that valves V1, V2 and V3 are in the position illustrated in Fig. 3B and valves V1', V2' and V3' are in the position illustrated in Fig. 3A, the oxygen containing revivifying gases enter reactors A, B and C from the respective valves V1, V2 and V3 through the respective lines 20, 30 and 40 and the spent revivifying gases and the combustion products pass from the reactors A, B and C to the respective valves V1', V2' and V3' through the respective lines 21, 31 and 41, the path of flow of the gases being otherwise the same, as previously described.

I claim as my invention:

1. In a process involving the endothermic conversion of a stream of heated hydrocarbons in contact with a mass of catalytic material which promotes the desired endothermic reaction, wherein heavy deleterious products of said reaction are deposited on the catalytic material and said deleterious products are periodically removed from said mass to renew its catalytic activity, the latter step involving an exothermic reaction, the improvement which comprises passing a heated stream of said hydrocarbons in series through a plurality of separate beds of said catalytic material, reheating said stream as it passes from each bed of the series to the next succeeding bed, periodically discontinuing the passage of hydrocarbons through said beds and reactivating the catalyst by passing an oxygen-containing gas serially through the catalyst beds, and cooling and adding oxygen to said gas intermediate the successive beds.

2. In a process involving the endothermic conversion of a stream of heated hydrocarbons in contact with a mass of catalytic material which promotes the desired endothermic reaction, wherein heavy deleterious products of said reaction are deposited on the catalytic material and said deleterious products are periodically removed from said mass to renew its catalytic activity, the latter step involving an exothermic reaction, the improvement which comprises passing a heated stream of said hydrocarbons in series through a plurality of separate beds of said catalytic material, each bed being of sufficiently small size that the decrease in the temperature of the reactants passing therethrough is not excessive, reheating said stream as it passes from each bed of the series to the next successive bed, periodically discontinuing the passage of said stream through said beds and renewing the activity of the catalyst by passing revivifying material through separate portions of said mass sufficiently small that the resulting exothermic reaction does not excessively increase the temperature of the catalytic material, the process being further characterized in that said initially heated stream of hydrocarbons is periodically diverted from its path of flow through said series of beds to and through another series of similar beds of said catalytic material, wherein the endothermic reaction is continued in the manner hereinbefore described, the activity of the catalyst in the first named series of beds being renewed during said diversion by passing a stream of heated relatively inert gases containing controlled minor amounts of oxygen through said first named beds in series, the last named stream being cooled and controlled minor amounts of oxygen being added thereto as it passes from each bed of the series to the next successive bed, and said stream of initially heated hydrocarbons being subsequently diverted back to the first named series of beds, whereupon the activity of the catalyst in the second named series of beds is renewed in the manner hereinbefore described.

LOUIS S. KASSEL.